Patented Aug. 24, 1943

2,327,815

UNITED STATES PATENT OFFICE 2,327,815

ALUMINUM SALT OF HYDROXY CARBOXYLIC ACIDS

Joseph G. Niedercorn, Riverside, and William O. Dawson, Greenwich, Conn., assignors to American Cyanamid Company, New York, N. Y., a corporation of Maine No Drawing. Application January 31, 1941, Serial No. 376,852

7 Claims. (Cl. 260—448)

This invention relates to new complex aluminum compounds of certain hydroxy carboxylic acids, which compounds possess valuable properties as tanning agents for hides and skins and as finishing agents for chrome tanned leather. The invention includes the new compounds themselves, their methods of preparation, and leather-treating compositions containing them.

We have found that 100% basic complex aluminum compounds can be prepared from certain hydroxy carboxylic acids by the reaction of inorganic aluminum compounds therewith in the presence of, or with subsequent addition of suitable amounts of strong alkalies. The organic acids which we have found to form 100% basic complex aluminum salts in this manner are the various members of the class consisting of lactic acid, gluconic acid, alpha-hydroxy isobutyric acid, tartaric acid, malic acid and citric acid, all of which are organic carboxylic acids containing at least one hydroxy group in the alpha position with respect to a carboxylic acid group. The resulting products in addition to their utility as leather finishing agents, also possess wetting, emulsifying and penetrating properties particularly in alkaline solution, and are further useful as mordants.

The 100% basic complex aluminum salts of our invention are prepared by reacting an inorganic aluminum compound such as an aluminum salt, an aluminate or aluminum hydroxide with 1 or more of the acids of the above defined class, or with an ester or mixture of esters thereof in the presence of, or with the subsequent addition of, a strong alkali such as sodium or potassium hydroxide. In carrying out the reaction it is essential to have three carboxylic acid groups present for each aluminum molecule, and therefore the amount to be employed is based, first, on the number of moles of aluminum present and, secondly, on the degree of basicity of the organic carboxylic acid. Thus, for example, where one mole of aluminum sulfate is used at least 6 moles of a monocarboxylic acid such as alpha-hydroxy isobutyric acid must be employed or at least 3 moles of a dicarboxylic acid such as tartaric or malic, or at least 2 moles of citric acid. Where sodium aluminate or aluminum hydroxide are used as the source of the aluminum, then the molar ratio of the carboxylic acid is of course half as much. Sufficient alkali must be used to form the trisodium or tripotassium or other 100% basic trihydroxy tricarboxalato-aluminate salts of our invention as well as to neutralize any inorganic acid groups that are introduced when an aluminum salt is used as the source of the aluminum.

The complex, 100% basic aluminum salts of our invention are defined by the probable structural formula

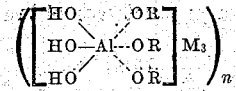

in which (1) each R may signify the acyl radical of a member of the group consisting of lactic acid, gluconic acid and alpha-hydroxy isobutyric acid, or (2) two adjacent R's together constitute the acyl radical of a member of the group consisting of tartaric acid and malic acid, or (3) three R's constitute the acyl radical of citric acid; M signifies a strong base such as sodium or potassium and $n$ equals a whole number. In cases 1 and 3 above $n$ probably equals unity and the compound is monomolecular; in case 2 $n$ probably equals 2 and the compound is probably dimolecular. This results from the fact that the three carboxylic groups needed in our new compounds in combination with the aluminum may be present as separate carboxylic acid radicals or as parts of a single tricarboxylic acid radical, in which case a monomolecular compound is obtained, or as parts of a dicarboxylic acid radical. In the latter case, however, it is still possible to obtain a monomolecular salt by employing one mole of a monocarboxylic acid in admixture with 1 mole of a dicarboxylic acid, both acids being members of the above defined group.

The invention will be illustrated in greater detail by reference to the following specific examples. It should be understood, however, that these examples are given primarily for purposes of illustration and that the invention in its broader aspects is not limited thereto.

Example 1

666.4 grams (1 mole) $Al_2(SO_4)_3.18H_2O$ were dissolved in an equal quantity of water by weight with the aid of heat. The solution was allowed to cool and then 2500 grams of water in which 624.36 grams (6 moles) of alpha-hydroxy isobutyric acid had been previously dissolved, was added gradually thereto with constant stirring. Finally a cold solution of 480 grams (12 moles) of sodium hydroxide dissolved in 1920 grams of water was added slowly to the above mixture with stirring and cooling to avoid material temperature rise. The product obtained was a clear solution of the complex aluminum salt together with sodium sulfate. The complex aluminum salt solution formed can be evaporated to dryness under a vacuum but the salt is extremely hygroscopic. Upon addition of acid to the aqueous solution an aluminum salt of the organic acid is precipitated.

Example 2

A dry mixture of 666.4 grams (1 mole) of $Al_2(SO_4)_3.18H_2O$, 384.1 grams (2 moles) of citric acid and 480 grams (12 moles) of caustic soda was dissolved in 5,000 grams of water with the aid of slight heating. The mixture was stirred until a clear solution of the basic complex trisodium-trihydroxyl aluminum salt of citric acid was formed. This salt has a higher solubility than the complex salt of alpha-hydroxy isobutyric acid and would not precipitate by the addition of acid.

*Example 3*

The same solutions were used as in Example 1 except that one-half of the sodium hydroxide solution containing 6 moles and over was first added to the solution of the alpha-hydroxy isobutyric acid to form the neutral salt thereof. To this neutral salt solution the aluminum sulfate was added and finally the remaining caustic solution. The same product was obtained as before in Example 1.

*Example 4*

The neutral sodium alpha-hydroxy isobutyrate was formed by the saponification of 792.6 grams of ethyl alpha-hydroxy isobutyrate with 240 grams of sodium hydroxide. The saponified product was then used in the same manner as the sodium alpha-hydroxy isobutyrate solution in Example 3. The product was the same as in Example 1, except for the presence of ethyl alcohol in the solution.

*Example 5*

77.99 grams (1 mole) of aluminum hydroxide and 120 grams (3 moles) of sodium hydroxide were added to 300 grams of water and the mixture heated until a clear solution resulted. The solution was then cooled to 30° C. and a solution of 312.18 grams (3 moles) of alpha-hydroxy isobutyric acid dissolved in an equal weight of water was added to the solution of the mixed hydroxides slowly and with constant agitation. By this method the trisodium-trihydroxyl alphabutyro aluminate solution contained no extraneous salt.

*Example 6*

163.94 grams (2 moles) of sodium aluminate and 160 grams (4 moles) of sodium hydroxide were added to 200 grams of water and the mixture heated and stirred until a clear solution resulted. This mixture was then cooled to 30° C. and 504.2 grams (3 moles) of tartaric acid dissolved in an equal weight of water was added gradually with agitation and cooled. This method also resulted in the formation of the solution of the trisodium-trihydroxyl aluminum salt of tartaric acid without the presence of any extraneous salt.

Having described our new chemical compounds and the manner in which the same are prepared, what we claim and desire to secure by Letters Patent is:

1. A 100% basic complex aluminum salt having the following general formula:

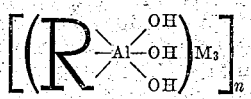

where R is selected from the group consisting of (1) the acid radicals of three molecules of a member of the group consisting of lactic, gluconic and alpha-hydroxyisobutyric acids, (2) the normal acid radicals of three molecules of a member of the group comprising tartaric and malic acids, and (3) the normal acid radical of one molecule of citric acid, M is a member of the group consisting of sodium and potassium, n is one when R is defined as (1) and (3) and two when R is defined as (2).

2. A method of preparing the 100% basic complex aluminum salts of claim 1 which comprises reacting in aqueous solution a water-soluble inorganic aluminum compound and a member of the group consisting of lactic, gluconic, alpha-hydroxy isobutyric, tartaric, malic and citric acids and their sodium and potassium salts in the presence of such an amount of a member of the group consisting of sodium and potassium hydroxides as is necessary to neutralize all acid present, the proportions of aluminum compound and acid compound being such that there are three carboxyl groups present for each aluminum atom.

3. A method of preparing a 100% basic complex aluminum salt which comprises reacting in aqueous solution one molar equivalent of aluminum in the form of aluminum sulfate with three molar equivalents of alpha-hydroxy isobutyric acid in the presence of six molar equivalents of a member of the group consisting of sodium and potassium hydroxides.

4. A method of preparing a 100% basic complex aluminum salt which comprises reacting in aqueous solution one molar equivalent of aluminum in the form of aluminum hydroxide with three molar equivalents of alpha-hydroxy isobutyric acid in the presence of 3 molar equivalents of a member of the group consisting of sodium and potassium hydroxides.

5. The compound having the formula:

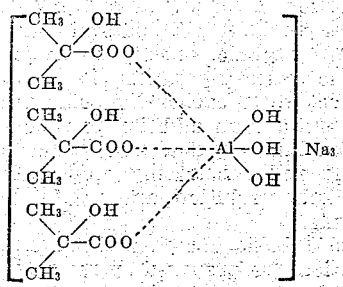

6. The compound having the formula:

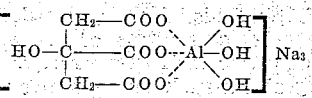

7. The compound having the formula:

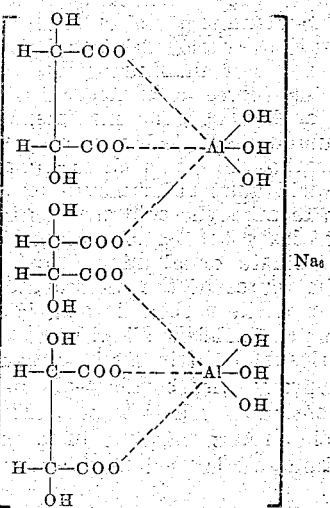

JOSEPH G. NIEDERCORN.
WILLIAM O. DAWSON.